United States Patent [19]

Setani

[11] Patent Number: 4,775,204
[45] Date of Patent: Oct. 4, 1988

[54] LIGHT SCANNING OPTICAL SYSTEM OF AN IMAGE OUTPUT SCANNER USING AN ELECTRO-MECHANICAL LIGHT MODULATOR

[75] Inventor: Michitaka Setani, Kawasaki, Japan

[73] Assignee: Canon Kabushiki Kaisha, Tokyo, Japan

[21] Appl. No.: 820,749

[22] Filed: Jan. 22, 1986

[30] Foreign Application Priority Data

Jan. 23, 1985 [JP] Japan .................................. 60-9157

[51] Int. Cl.⁴ .............................................. G02B 26/10
[52] U.S. Cl. ..................................... 350/6.6; 350/486; 358/233
[58] Field of Search ................. 350/6.6, 6.8, 6.9, 6.91, 350/360, 486, 487; 358/233, 293

[56] References Cited

U.S. PATENT DOCUMENTS

| | | | |
|---|---|---|---|
| 3,746,911 | 7/1973 | Nathanson et al. | 358/233 |
| 3,886,310 | 5/1975 | Guldberg et al. | 350/360 |
| 4,199,219 | 4/1980 | Suzki et al. | 350/6.8 |
| 4,454,547 | 6/1984 | Yip et al. | 358/293 |
| 4,512,625 | 4/1985 | Brueggemann | 350/6.8 |
| 4,523,801 | 6/1985 | Baba et al. | 350/6.8 |

FOREIGN PATENT DOCUMENTS 3131227A 2/1983 Fed. Rep. of Germany.

OTHER PUBLICATIONS

Translation of the Official Letter dated Jan. 12, 1988.

Primary Examiner—John K. Corbin
Assistant Examiner—Loha Ben
Attorney, Agent, or Firm—Fitzpatrick, Cella, Harper & Scinto

[57] ABSTRACT

A light scanning optical system of an image output scanner comprises an electro-mechanical light modulator comprising a number of elements irradiated with a light beam from a light source and capable of deflecting the light beam in at least two directions in accordance with an input signal, the elements being arranged in the main scan direction, each of the elements making image information by the change-over of the direction of deflection, and a projection optical system for projecting only the signal light of the image information. The optical axis of the projection optical system is perpendicular to the array of the element of the modulator.

12 Claims, 5 Drawing Sheets

LIGHT SCANNING OPTICAL SYSTEM OF AN IMAGE OUTPUT SCANNER USING AN ELECTRO-MECHANICAL LIGHT MODULATOR

BACKGROUND AND SUMMARY OF THE INVENTION

This invention relates to a light scanning optical system of an image output scanner using an electro-mechanical light modulator.

An image output scanner is a device used in a copying apparatus, a facsimile apparatus or the like to scan the image of an original such as a document and put out the image as image information by a light or an electrical signal. Various forms of such image output scanner are known.

For example, many of the image output scanners used in popular PPC copying apparatuses are of the type in which an original is scanned by the light of a halogen lamp or the like and the reflected light therefrom is directly imaged on an electrophotographic photosensitive medium. Besides these, there is a method whereby, as in a laser beam printer, the image of an original is converted into an electrical signal, whereafter on the basis of this signal, a laser beam is modulated by the use of a light modulator and is imaged on a photosensitive medium.

Also, in recent years, along with the development of the integrated circuit technique, there has been proposed an image output scanner using an electromechanical light modulator having a number of minute deflecting elements on a base.

The general construction of such image output scanner will hereinafter be described with reference to the accompanying drawings.

Figure 1:
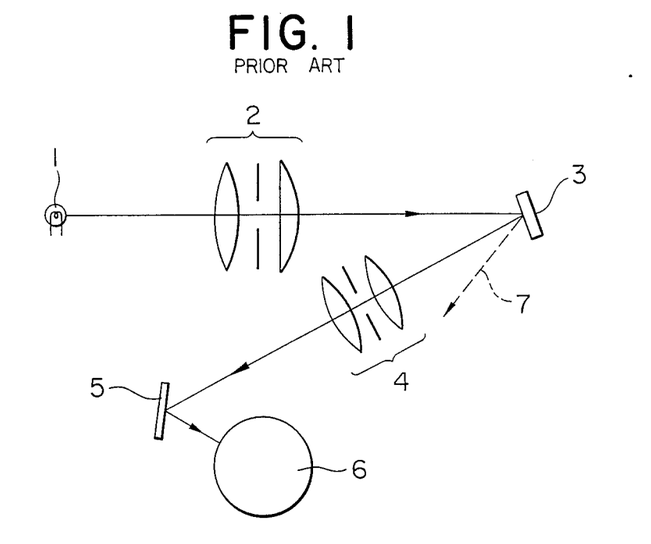
FIG. 1 schematically shows an example of the image output scanner using an electro-mechanical light modulator according to the prior art.

FIG. 1 schematically shows an example of the image output scanner using the above-described electro-mechanical light modulator (hereinafter simply referred to as the light modulator). In FIG. 1, reference numeral 1 designates a light source such as a tungsten lamp, reference numeral 2 denotes an irradiating optical system, reference numeral 3 designates a light modulator, reference numeral 4 denotes a projection optical system, reference numeral 5 designates a reflecting mirror, and reference numeral 6 denotes a photosensitive drum.

The light from the lamp 1 is applied onto the light modulator 3 by the irradiating optical system 2, and only the necessary image signal reflected light is condensed on the photosensitive drum 6 by the projection optical system 4 via the reflecting mirror 5. At present, in such an image output scanner, various shapes of the light modulator 3 are conceived.

Figure 2A:
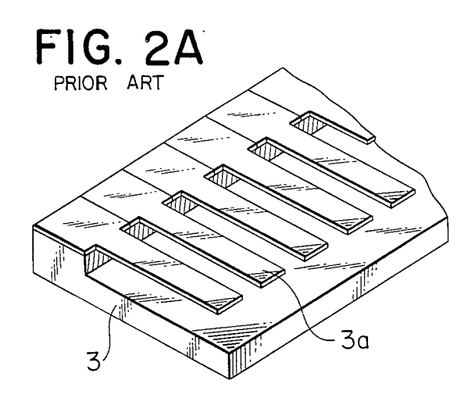
FIGS. 2A and 2B illustrate the light modulator of the prin art in FIG. 1.
Figure 2B:
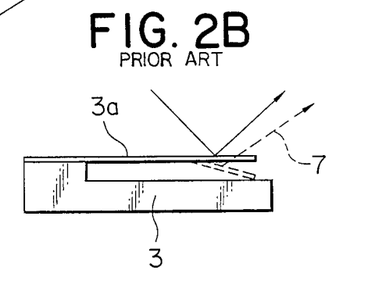

FIG. 2A is an enlarged schematic perspective view showing an example of such light modulator 3, and FIG. 2B is an enlarged schematic side view thereof.

In FIG. 2, reference character 3a designates mirror picture element plates adapted to be bent up and down by electromechanical means. As shown in FIG. 2B, the direction of the reflected light 7 from the downwardly bent mirror picture element plate 3a (indicated by dotted lines) differs from the direction of the reflected light from the unbent mirror picture element plate 3a (indicated by solid lines). By the directions of the plurality of mirror picture element plates 3a being thus discretely changed in accordance with an image signal input to the light modulator 3, an electrostatic latent image corresponding to the image signal can be formed on the surface of the photosensitive drum 6. The electrostatic latent image is converted into a visible image by the well-known electrophotographic process.

However, in the image output scanner as described above, the direction of bending of the mirror picture element plate 3a does not twist but is downwardly inclined with respect to the side of the mirror picture element plate 3a as shown in FIG. 2B and therefore, separation of the signal light and the unnecessary reflected light 7 becomes difficult when the diffraction in the image space is considered. As a result, the distance between the light modulator 3 and the projection optical system must be made long until two diffracted lights can be separated from each other. This is nothing but to make the optical system large in the lateral direction thereof. Also, even if the two diffracted lights could be separated from each other at a short distance, making the optical system compact or obtaining the good imaging characteristic would encounter a problem that an optical contrivance for shortening the focal length of the projection optical system or the like is required.

It is an object of the present invention to provide a light scanning optical system of an image output scanner using an electro-mechanical light modulator which imaging characteristic is good.

It is a further object of the present invention to provide a compact light scanning optical system which can efficiently separate unnecessary diffracted light and image signal light from each other and which imaging characteristic is good.

It is still a further object of the present invention to provide a light scanning optical system which is excellent in quality of printing.

According to the present invention, in order to solve the above-noted problems, there is provided a light scanning optical system of an image output scanner in which a light beam from a light source is applied to an electro-mechanical light modulator comprising a number of elements capable of deflecting the light beam in at least two directions and arranged in the main scan direction and a deflected light beam is made according to an input signal by the changeover of the direction of deflection of each element, whereafter only a necessary light is projected onto, for example, a photosensitive member by a projection optical system, characterized in that the optical axis of the projection optical system is perpendicular to the array of the elements of the modulator.

DESCRIPTION OF THE PREFERRED EMBODIMENT

A specific embodiment of the present invention will hereinafter be described with reference to the drawings.

Figure 3A:
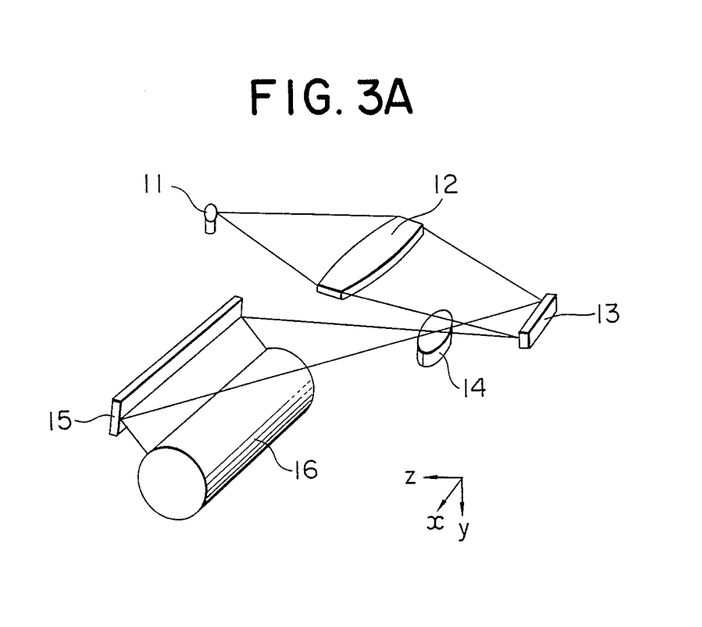
FIG. 3A is a schematic perspective view of the optical system of the present invention.
Figure 3B:
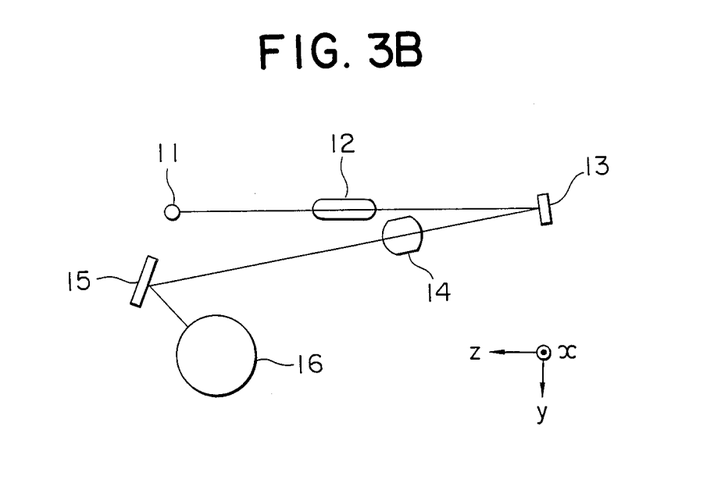
FIGS. 3B and 5 are cross-sectional views of the optical system of the present invention.

FIG. 3A is a schematic perspective view showing an embodiment of the light scanning optical system of the present invention, and FIG. 3B is a cross-sectional view thereof.

In FIGS. 3A and 3B, reference numeral 11 designates a lamp as a light source, reference numeral 12 denotes an irradiating optical system (including the reflection type also and shown as a condenser lens), and reference numeral 13 designates an electro-mechanical light modulator. A light beam emitted from the lamp 11 is applied onto the electro-mechanical light modulator 13 by the condenser lens 12 and is modulated thereby, and thereafter is reflected. The reflected light is magnification-changed by a projection optical system 14 (including the reflection type also and shown as a projection lens) in conformity with a desired printing width and resolution, whereafter it is projected onto a photosensitive drum 16 via a reflecting mirror 15.

The lamp 11 need not be a laser of great intensity, but may sufficiently be an inexpensive lamp such as a conventional tungsten halogen lamp used in a moving picture projector or the like, because in the main scan direction, imaging is effected on the photosensitive drum 16 substantially at the same time and therefore a long exposure time can be secured.

Figure 4A:
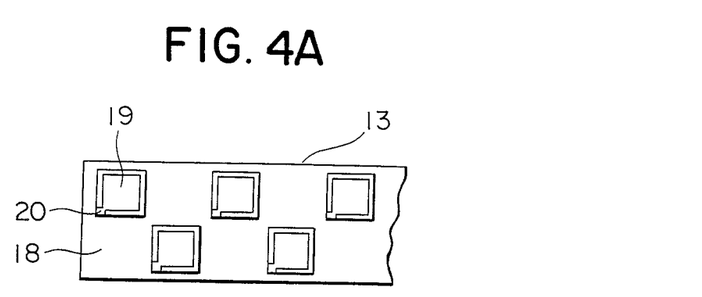
FIG. 4A is an enlarged front view of an electro-mechanical light modulator according to the present invention.

FIG. 4A is an enlarged front view of the electro-mechanical light modulator 13 (hereinafter simply referred to as the light modulator). Reference numeral 18 designates a flat base portion, and reference numeral 19 denotes mirror picture element plates having a surface whose inclination can be changed. In the case of FIG. 4A, a number of such mirror picture element plates 19 are arranged in two rows.

The light modulator 13 is manufactured by a process similar to the process of manufacturing IC or LSI, and has a construction similar to that of an MOS type FET transistor. The dimension of each side of each mirror picture element plate 19 is minute, say, of the order of 5–15 μm. Such picture element plates are described in detail in U.S. Application Ser. No. 748,835 assigned to the assignee of the present application.

Figure 4B:
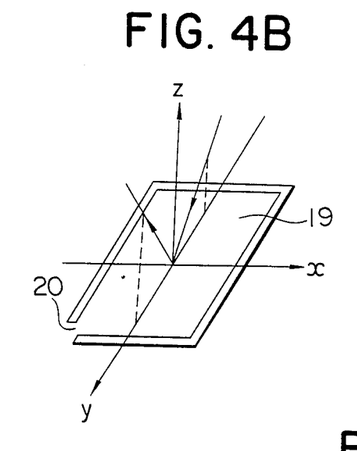
FIGS. 4B and 4C show the movement of a picture element on the light modulator of FIG. 4A.
Figure 4C:
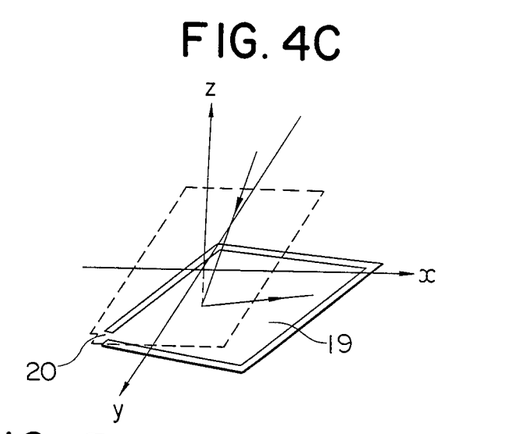
Figure 5:
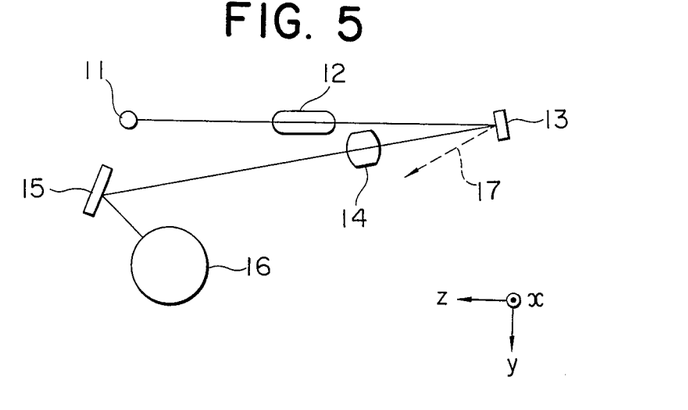

Each of the above-described mirror picture element plates 19 keeps its parallelism to the base in the signal OFF state as shown in FIG. 4B in accordance with an input binary modulation signal, and falls downwardly with a hinge portion 20 as the axis of rotation in the signal ON state as shown in FIG. 4C. This falling-down takes place about the hinge portion 20 at a corner of the quadrilateral of the mirror picture element plate 19 and thus, unlike the bending of the surface of the mirror picture element plate 3a as shown in FIG. 2A, the surface of the mirror picture element plate 19 after it has fallen down is obliquely inclined with respect to the surface thereof before it falls down. The light having entered the light modulator 13 is reflected and deflected in conformity with the angle of fall-down. This state is shown in FIG. 5, wherein the reflected light 17 indicated by dotted line is that in the signal OFF state. Of these two directions of reflection, the reflected light beam in the signal ON state is directed onto the photosensitive drum 16 by the projection lens 14, whereby there is obtained a row of dots corresponding to each picture element input modulation signal. Each dot is formed correspondingly to the signal ON and OFF of each picture element and therefore is high in information processing function.

Figure 6:
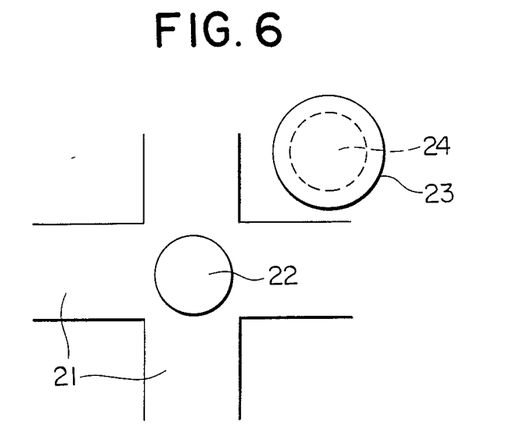
FIG. 6 shows the distribution of light on a plane containing the entrance pupil of a projection lens.

FIG. 6 schematically shows the distribution of the reflected light on a plane containing the entrance pupil of the projection lens 14 spaced apart from the light modulator 13 by a finite distance in the direction of reflection.

In FIG. 6, reference numeral 21 designates the distribution of the reflected light 17 in the signal OFF state, i.e., the diffraction pattern of unnecessary light, and reference numeral 22 denotes the image of the filament of the light source. Reference numeral 23 designates the entrance pupil of the projection lens 14, and reference numeral 24 denotes the distribution of the reflected light in the signal ON state, i.e., the necessary light modulation signal.

Figure 7A:
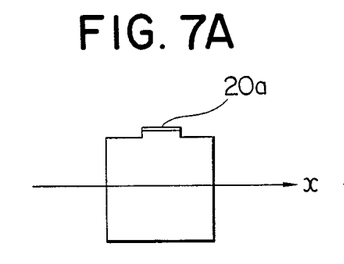
FIGS. 7A, 7B, 7C and 7D illustrate various cases where the position at which a hinge portion is attached to a mirror picture element plate is changed.
Figure 7B:
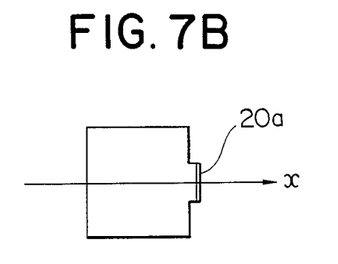
Figure 7C:
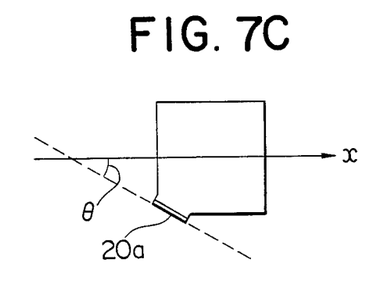
Figure 7D:
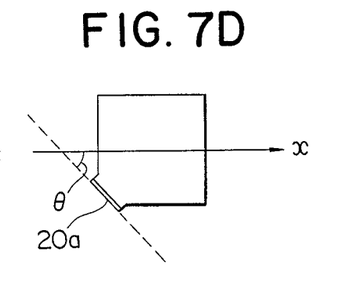

The size of each of said mirror picture element plates 19 is of such a degree that the diffraction of the incident light beam cannot be neglected, from the limitation in the arrangement thereof, and since the shape of each picture element is quadrilateral, this diffraction pattern widens in the form of a cross in the directions of the respective sides of the quadrilateral, as shown in FIG. 6. By bringing down each mirror picture element plate 19 obliquely with the hinge 20 at a corner of the quadrilateral of the picture element plate 19 as the axis of rotation, as previously described, it becomes possible to set the signal light so as not to overlap the cross of the diffraction pattern 21 of the unnecessary light. Bringing down the mirror picture element plate obliquely will now be described in detail. FIGS. 7A–7D show the cases where the hinge portion 20 is attached to various portions of the mirror picture element plate 19. In FIGS. 7A–7D, reference character 20a designates the axis of rotation of the hinge portion, and the x-axis is the coordinates axis plotted in the same direction as the main scan direction. If the axis of rotation is provided as shown in FIGS. 7A and 7B (the case of the prior art), it will be difficult for the diffraction pattern of the necessary signal light to be separated from the cross of the diffraction pattern of the unnecessary light, but if the axis of rotation is provided as shown in FIGS. 7C and 7D, such separation will become easy as previously described. That is, if the angle $\theta$ formed between the axis of rotation and the x-axis is any other angle than 0 or $\pi/2$, the aforementioned effect will occur more or less, and it can be expected that the effect will be greatest particularly when the angle $\theta$ is $\pi/4$. Consequently, if the axis of rotation 20a is set so that $\theta = \pi/4$, the separation of the two reflected lights will become best and the diffracted light 21 as the noise entering the entrance pupil 23 can be extremely reduced.

Figure 8:
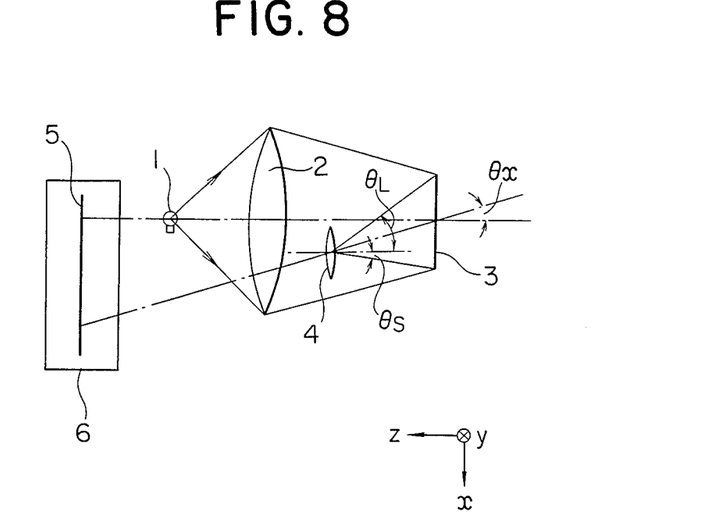
FIG. 8 is a plan view of an optical system of a first embodiment in which the angle of view of the projection lens is not symmetrical.

FIG. 8 is a schematic plan view of a light scanning optical system using a light modulator 3 having mirror picture element plates 3a having the effect as described above.

In FIG. 8, the numbers of the elements are similar to those in FIG. 1. As is apparent from FIG. 8, the angles of view $\theta_L$ and $\theta_S$ which the projection lens 4 subtends the light modulator array 3 are asymmetrical with respect to the optic axis of the projection lens 4 and after all, the view angle performance of the projection lens 4 covers the great angle $\theta_L$. The view angle performance is naturally limited in each lens and, if an attempt is made to construct the lens by a simple optical system, the angle of view must be made small as a matter of course and the focal length of the projection lens 4 must be made long. This means making the optical system of the present invention bulky. If, in FIG. 8, the signal emission optic axis and the optic axis of the projection lens 4 are made coincident with each other by rotating the projection lens 4 by an angle $\theta_X$, the angle of view will apparently become symmetrical with respect to the optic axis, but the array of the light modulator 3 which is the object plane as viewed from the projection lens 4 will have an inclination relative to the lens 4 and will deviate from the depth of focus of the projection lens on the opposite sides thereof, and it will become difficult to obtain a good imaging characteristic Namely, in the first embodiment of FIG. 8, the imaging characteristic is good though the compactness might be sacrificed to a little extent.

Figure 9:
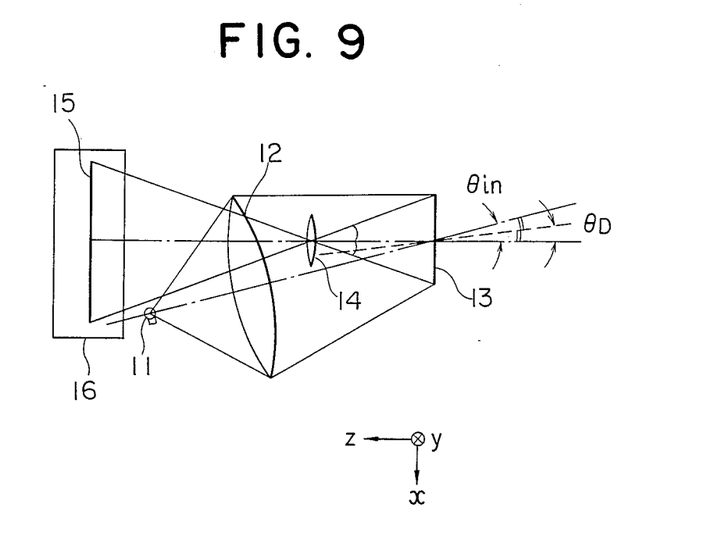
FIG. 9 is a plan view of the optical system of a second embodiment.

FIG. 9 shows an optical system devised to solve the above-noted problem of the first embodiment and characterized in satisfying the following condition.

Design should be made such that the angle of view which a projection lens 14 covers with respect to a deflected and reflected component light beam corresponding to the necessary signal light is symmetrical with respect to the optic axis of the projection lens 14 and intersects the optic axis of this projection lens at the center of the array of a light modulator element 13 in the main scan direction (in other words, design should be made such that $\theta_x=0$ in FIG. 8).

As a method for satisfying the condition as described above, it is conceivable to make design such that the optic axis of the illuminating system leading from a light source 11 via a condenser lens 12 to the center of the light modulator 13 in the main scan $\theta_{in}=2\theta_D$). This originates from the conception that by the utilization of the fact that the deflection of the angle of the reflected light of the incident light beam is $2\cdot\Delta\theta$ when the reflecting surface is inclined by $\Delta\theta$, the light beam entering from the condenser lens 12 is made inclined in advance so that when each picture element array of the light modulator 13 has been inclined, the diffracted light therefrom enters the projection lens 14 well. In FIG. 9, the reference of these angles is the improved optic axis, i.e., the straight line passing through the center of the array element of the light modulator 13 in the main scan direction and the center of the pupil of the projection lens 14 (the prependicular at the central position of the element array in the main scan direction).

The present invention is not restricted to the above-described embodiment, but various modifications thereof are possible.

For example, it is apparent that the shape of the mirror picture element plates on the light modulator is not limited to a quadrilateral, but may be a lozenge, a triangle or an ellipse to obtain the same effect.

As another important thing, to reduce the diffracted light entering as noise, the expanse of the diffracted light pattern 21 may be made small, but the expanse of this diffracted light pattern 21 is in a deep relation with the shape of the condenser lens 12.

The illuminating condenser lens 12 can be made very flat because, as shown in FIG. 4A, the arrangement of the picture element plates 19 on the modulator 13 is in two rows and therefore it suffices to apply a laterally elongated slit light beam. On the contrary, if the condenser lens 12 is made not flat but thick, the light beam entering the light modulator 13 includes much of the light beam perpendicular to the main scan direction and the expanse and intensity of the diffraction pattern are made great and as a result, it becomes difficult to take out only the necessary light modulation signal even if the angle $\theta$ is optimally selected as described above. Consequently, it is preferable to make the condenser lens 12 flat.

Also, making the condenser lens 12 flat leads to a great advantage that the optical system is made compact in the direction of height.

Further, by the condenser lens 12 and the projection lens 14 used in the present invention being made flat as shown in FIGS. 3A and 3B, the optical system can be made compact in the direction of height. Particularly, making the projection lens 14 flat causes the aperture ratios of the projection lens 14 in the main scan direction and the subscan direction to differ from each other relative to the light modulator 13 as a secondary light source, and the shape of each dot imaged on the photosensitive drum 16 through the projection lens 14 becomss longer in the sub scan direction than in the main scan direction, and this is preferable in the quality of printing or image depiction.

Further, disposing the projection lens 14 in a flat form parallel to the lateral direction of the light modulator array elements leads to the possibility of separating and eliminating the noise-providing unnecessary diffracted light component while keeping the distance between the projection lens and the light modulator array elements short even in a case where the difference in the angle of reflection and deflection of the light modulator array between the ON state and the OFF state can only assume a small angle, and this also leads to an advantage that the optical system can be made compact in the lateral direction.

According to the first embodiment, the optical axis of the projection lens is not inclined relative to the element array of the modulator and the good imaging characteristic is maintained.

According to the second embodiment of the present invention as described above, the angle of view of the projection lens is symmetrical with respect to the optic axis thereof, and the limit angle of view of such projection lens can be made great as compared with that of a projection lens having an asymmetrical angle of view which does not adopt the arrangement of the second embodiment. In other words, in a lens having an equal view angle performance, it becomes possible to set the focal length thereof shortly and accordingly shorten the projection optical system.

I claim:

1. A light scanning optical slystem of an image output scanner, comprising:
   a light source;
   an electro-mechanical light modulator, said modulator including an array of elements arranged in a main scan direction and each capable of deflecting an incident light beam from said light source in at least two directions in accordance with an input signal, each of said elements making image information by a change-over of a direction of deflection of each of said elements and rotating about an axis of rotation which forms an angle other than 0 and π/2 relative to the main scan direction to thereby deflect the incident light beam from said light source;

an irradiating optical system for irradiating said electro-mechanical light modulator with the light beam from said light source; and a projection optical system for projecting only a signal light of the image information, which is deflected in at least one direction of said at least two directions, the optical axis of said projection and irradiating optical systems forming an angle of $2 \cdot \theta_D$ in a plane including the optical axis of said irradiating optical system and the array of elements where an angle component of deflection of each of said elements for making said signal light, in said plane, is $\theta_D$.

2. A light scanning optical system according to claim 1, wherein the shape of said projection optical system is flat in the main scan direction.

3. A light scanning optical system according to claim 1, wherein the shape of said irradiating optical system is flat in the main scan direction.

4. A light scanning optical system of an image output scanner, comprising:

a light source;

an electro-mechanical light modulator, said modulator including an array of elements arranged in a main scan direction and each capable of deflecting an incident light beam from said light source in at least two directions in accordance with an input signal, each of said elements making image information by a change-over of a direction of deflection of each of said elements and rotating about an axis of rotation which forms an angle other than 0 and π/2 relative to the main scan direction and thereby deflect the incident light beam from said light source;

an irradiating optical system for irradiating said electro-mechanical light modulator with the light beam from said light source; and a projection optical system for projecting only a signal light of the image information which is deflected in at least one direction of said at least two directions, the optical axis of said projection optical system being deviated from that of said irradiating optical system and diffraction lights generated by each of said elements when each of said elements generates lights other than said signal light mostly falling without said projection optical system.

5. An optical system of an image output apparatus comprising:

a light source;

an electro-mechanical light modulator, said modulator including an array of elements arranged in a predetermined direction and each capable of deflecting an incident light beam from said light source in at least two directions in accordance with an input signal, each of said elements making image information by a change-over of a direction of deflection of each of said elements and rotating about an axis of rotation which forms an angle other than 0 and π/2 relative to the predetermined direction to deflect the incident light beam from said light source;

an irradiating optical system for irradiating said electro-mechanical light modulator with the light beam from said light source; and a projection optical system for projecting only a signal light of the image information which is deflected in at least one direction of said at least two directions, the optical axes of said projection and irradiating optical systems forming an angle of $2 \cdot \theta_D$ in a plane including the optical axis of said irradiating optical system and said array of elements where an angle component of deflection of each of said elements for making said signal light, in said plane, is $\theta_D$.

6. An optical system according to claim 56, wherein the shape of said projetion optical system is flat in the predetermined direction.

7. An optical system according to claim 5, wherein the shape of said irradiating optical system is flat in the predetermined direction.

8. An optical system of an image output apparatus comprising:

a light source;

an electro-mechanical light modulator, said modulator including an array of elements arranged in a predetermined direction and each capable of deflecting an incident light beam from said light source in at least two directions in accordance with an input signal, each of said elements making image information by a change-over of a direction of deflection of each of said elements and rotating about an axis of rotation which forms an angle other than 0 and π/2 relatively to the predetermined direction to thereby deflect the incident light beam from said light source;

an irradiating optical system for irradiating said electro-mechanical light modulator with the light beam from said light source; and a projection optical system for projecting only a signal light of the image information which is deflected in at least one direction of said at least two directions, the optical axis of said projection optical system being deviated from that of said irradiating optical system and diffraction light generated by each of said elements when each of said elements generates light other than said signal light mostly falling without said projections optical system.

9. An optical system of an image output apparatus comprising:

a light source;

an electro-mechanical light modulator, said modulator including an array of elements arranged in a predetermined direction and each capable of deflecting an incident light beam from said light source in at least two directions in accordance with an input signal, each of said elements making image information by a change-over of a direction of deflection of each of said elements and rotating about an axis of rotation which forms an angle other than 0 and 90 /2 relative to the predetermined direction to deflect the incident light beam from said light source;

an irradiating optical system for irradiating said electro-mechanical light modulator with the light beam from said light source; and a projection optical system for projecting only light which is deflected in at least one direction of said at least two directions, the optical axes of said projection and irradiating optical systems forming an angle of $2 \cdot \theta_D$ in a plane including the optical axis of said irradiating optical system and said array of the elements where an angle component of deflection by each of said elements when each of said elements deflects the light in said at least one direction of said at least two directions, in said plane, is $\theta_D$.

10. An optical system according to claim 9, wherein the shape of said projection optical system is flat in the predetermined direction.

11. An optical system according to claim 9, wherein the shape of said irradiating optical system is flat in the predetermined direction.

12. An optical system of an image output apparatus comprising:
a light source;
an electro-mechanical light modulator, said modulator including an array of elements arranged in a predetermined direction and each capable of deflecting an incident light beam from said light source in at least two directions in accordance with an input signal, each of said elements making image information by a change-over of a direction of deflection of each of said elements and rotating an axis of rotation which forms an angle other than 0 and $\pi/2$ relative to the predetermined direction to deflect the incident light beam from said light source;
an irradiating optical system for irradiating said electro-mechanical light modulator with the light beam from said light source; and
a projection optical system for projecting only light which is deflected in at least one of said at least two directions, the optical axis of said projection optical system being deviated from that of said irradiating optical system and light directed by each of said elements in directions other than said at least one of said at least two directions mostly falling without said projections optical system.

* * * * *

UNITED STATES PATENT AND TRADEMARK OFFICE
CERTIFICATE OF CORRECTION

PATENT NO. : 4,775,204
DATED : October 4, 1988
INVENTOR(S) : MICHITAKA SETANI

It is certified that error appears in the above-identified patent and that said Letters Patent is hereby corrected as shown below:

COLUMN 2

Line 12, "system" should read --system 4--.
Line 56, "prin" should read --prior--.
Line 57, "of the" should read --of an embodiment of the--.

COLUMN 5

Line 40, "scan $\theta_{in}=2\ \theta_D$)." should read --scan direction interacts at an angle of $2\cdot\theta_D$ in FIG. 9 where the angle of reflection and deflection in the cross-section of an element 19 taken along a plane X-Z is $\theta_D$ (in other words, to make a design such that $\theta_{in}=2\ \theta_D$).--.
Line 53, "prependicular" should read --perpendicular--.

COLUMN 6

Line 37, "ON state" should read --ON state--.
Line 58, "slystem" should read --system--.

COLUMN 8

Line 11, "claim 56," should read --claim 5,--.
Line 43, "projections" should read --projection--.
Line 56, "90 /2" should read --$\pi/2$--.

UNITED STATES PATENT AND TRADEMARK OFFICE
CERTIFICATE OF CORRECTION

PATENT NO. : 4,775,204
DATED : October 4, 1988
INVENTOR(S) : MICHITAKA SETANI

It is certified that error appears in the above-identified patent and that said Letters Patent is hereby corrected as shown below:

COLUMN 10

Line 17, "projections" should read --projection--.

Signed and Sealed this

Eleventh Day of April, 1989

Attest:

DONALD J. QUIGG

Attesting Officer

Commissioner of Patents and Trademarks